United States Patent [19]

Thimon

[11] Patent Number: 5,040,356
[45] Date of Patent: Aug. 20, 1991

[54] METHOD OF WRAPPING A LOAD WITH STRETCHABLE PLASTIC MATERIAL

[75] Inventor: Jacques B. Thimon, Mountainside, N.J.

[73] Assignee: Newtech Packing Equipment Corp., Mountainside, N.J.

[21] Appl. No.: 107,849

[22] Filed: Oct. 6, 1987

Related U.S. Application Data

[63] Continuation of Ser. No. 728,220, Apr. 29, 1985, abandoned.

[51] Int. Cl.⁵ .................. B65B 53/00; B29C 55/10
[52] U.S. Cl. ............................. 53/441; 264/288.8; 264/290.2
[58] Field of Search ............. 264/1.3, 288.8, 290.2; 26/72; 226/168; 206/497; 53/441, 442, 556

[56] References Cited

U.S. PATENT DOCUMENTS

| | | | |
|---|---|---|---|
| 2,505,146 | 4/1950 | Ryan | 264/1.3 |
| 2,571,355 | 10/1951 | Gardner | 264/290.2 |
| 3,350,491 | 10/1967 | Rasmussen | 264/290.2 |
| 3,441,638 | 4/1969 | Patchell et al. | 264/154 |
| 3,632,716 | 1/1972 | Fairbanks | 264/290.2 |
| 3,833,973 | 9/1974 | Schwarz | 264/290.2 |
| 4,140,827 | 2/1979 | Willwerth | 264/288.8 |
| 4,302,920 | 12/1981 | Lancaster et al. | 53/441 |
| 4,458,467 | 7/1984 | Shulman et al. | 53/556 |

FOREIGN PATENT DOCUMENTS

| | | |
|---|---|---|
| 0110751 | 10/1983 | European Pat. Off. . |
| 2026328 | 12/1969 | France . |
| 2281275 | 8/1974 | France . |
| 55225 | 1/1967 | Luxembourg . |

*Primary Examiner*—James Lowe
*Attorney, Agent, or Firm*—Kenyon & Kenyon

[57] ABSTRACT

In a method for stretching plastic involving a stretching device incorporated into a stretch wrap machine for producing stretched plastic for wrapping a load, means are provided for stretching a sheet of stretchable plastic material at an angle across one or more stretching devices. The method comprises stretching the plastic over a plurality of generatrices in substantially parallel arrangement, moving the generatrices in an eccentric path about a central axis, and moving the generatrices in the axial directions, in staggered coordination. The movement of the generatrices imparts a biaxial stretch pattern upon the plastic and produces a neck down pattern.

2 Claims, 4 Drawing Sheets

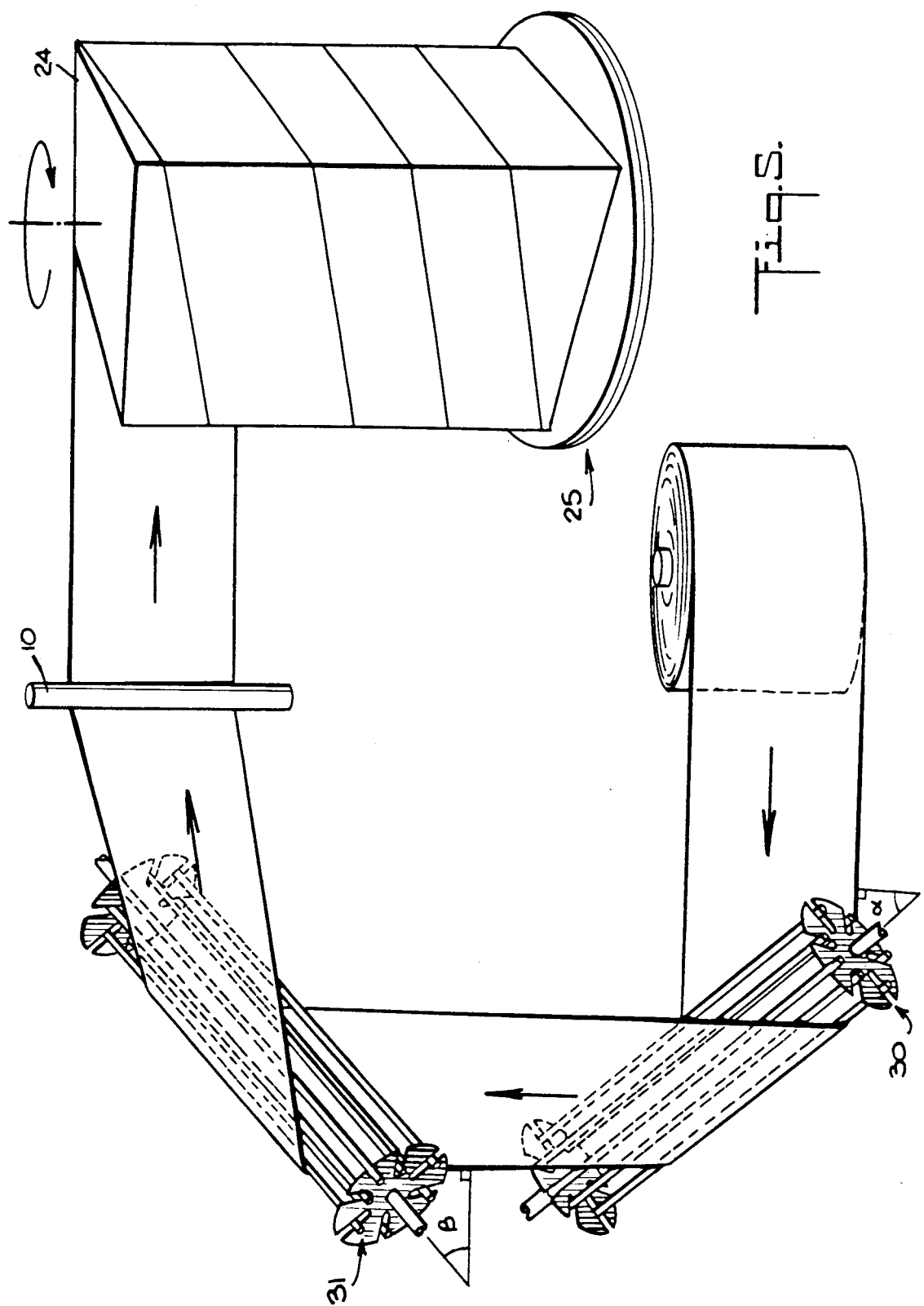

METHOD OF WRAPPING A LOAD WITH STRETCHABLE PLASTIC MATERIAL

This application is a continuation, of application Ser. No. 728,220, filed Apr. 29, 1987 now abandoned.

BACKGROUND OF THE INVENTION

1. Field of Invention

The present invention relates to automated methods and apparatus for producing biaxially stretched plastic material and more particularly to automated wrapping processes.

2. Description of Prior Art

Plastic is commonly used to form protective wraps. For example, objects being stored, shipped or distributed may require protection from handling, the environment, etc. Also, multiple unit products may require a wrap to secure them into a single, more manageable load.

There are primarily two kinds of plastic wraps. "Heat shrink" wraps are formed by wrapping a load and then subjecting the wrap to an elevated temperature. This causes the plastic to contract and bind the load. The drawbacks of heat-shrink wraps are well known. The heated plastic becomes rigid, and if the load settles, the wrap fails to exert a compressive force.

The second kind of plastic wrap is a "stretch wrap." This involves wrapping an object in stretched plastic so that as the plastic contracts, it binds the load. Because the stretched plastic is not rigid, it continues to exert a compressive force even if the load settles.

However, stretch wrap was not without its compromises. In contrast to heat shrink wrap, which contracts along its length and width, or biaxially, stretch wrap contracts only in the direction it is previously stretched. Because simultaneously stretching in biaxial directions has proven to be a formitable mechanical engineering problem, stretch wrap, and the devices and methods for producing it, generally stretch only along the length of the material.

There are primarily two kinds of commercially available plastic stretch wrapping machines: rotary machines and pass-through machines. Rotary machines rotate either a load or a dispenser to wind plastic material around the load. Pass-through machines move the load into a suspended, "U"-shaped curtain of plastic material and seal the ends of the pocket behind the load. The plastic material may be stretchable material, mesh, netting or the equivalent.

These machines generally use techniques for stretching the plastic that fall into two categories. The first category is known as "braking systems." In rotary machines, these systems generally involve withdrawing a material of stretchable plastic from a roll so as to wrap a rotating load. As the load rotates, and the plastic material wraps around it, a brake is applied to the roll, causing the plastic to stretch. Other braking systems revolve the roll around the load to achieve similar results.

Pass-through machines incorporate a braking system by pushing the load into a taut plastic curtain suspended between two rolls of plastic. By braking the unwinding of one or two rolls while moving the object through the curtain, the plastic is stretched around the front and sides of the load. Sealing devices close behind the load to form a complete wrap.

Braking systems stretch the material as it winds around the load. The stretching produces a reduction in the width of the material, which is known as "neck-down." These systems suffer a number of drawbacks. Uneven stretching caused by corners, edges and protrusions tend to cause the plastic to rupture. To compensate, the amount of stretch is typically reduced, thereby resulting in a looser wrap. Further, because the stretching is substantially along the length of the material, the wrap does not exert a compression force along the width of the material.

To alleviate some of these problems, a second category of systems was developed: pre-stretch systems. This type of system is described, for example, in French Patent No. 2,281,275. This system has proven to be a generally acceptable system for producing plastic wrap which will exert a force along the length of the material. Because the force necessary to stretch the plastic is greater than the force necessary to oppose its subsequent contraction, pre-stretching the material reduces the rupturing problems caused by protrusions, edges, etc.

Roller pre-stretch systems operate by passing plastic material along a series of rollers which are rotated so that the downstream rollers rotate faster than the upstream rollers. The extent to which the plastic is stretched between the series of rollers depends upon the difference in rotational speeds of the rollers. may rotate at equal speeds but the downstream roller has a greater circumference than the upstream roller. The stretched plastic is then used to form a wrap in either the rotary or pass-through manner Some roller pre-stretch machines also wrap the load faster than the pre-stretched plastic is dispensed, so as to further stretch the material as it is being applied to the load. In systems which combine prestretch and braking systems, the material neck-down occurs in two places; between the rollers themselves and between the rollers and the load.

Pass-through pre-stretch systems, unlike braking systems which force the object into the material curtain, operate by extending the pair of rollers through a taut plastic curtain. The movement of these rollers forms a "U-shaped" pocket of pre-stretched plastic material into which the object is moved. Sealing devices join the material ends behind the object.

A common feature of the above described machines and systems is unidirectional stretching, i.e., stretching the material along its length. While pre-stretching does reduce rupturing problems and provides more attractive, tighter packages as discussed above, the contraction in such wraps is along the axis of stretch. Because, consumers requiring biaxial contraction in a plastic wrap must currently accept the limitations of heat shrink plastic, it would be advantageous to provide a convenient method and apparatus for producing a plastic sheet that is stretched in two directions: its length and its width. Such biaxially stretched plastic would contract more uniformly around wrapped objects and particularly irregularly shaped objects. Further, uniform neck-down has no areas of extra "give" to compensate for protrusions, corners and edges. Thus, in addition to the above considerations, it would also be advantageous to have non-uniform neck-down.

Accordingly, it is an object of the present invention to provide an apparatus for producing biaxially stretched plastic material and an method for using that apparatus.

It is another object of the present invention to produce a wrap formed of biaxially stretched plastic material.

It is yet another object of the present invention to provide a biaxially stretched plastic material that does not have a uniform neck-down, which provides areas of extra "give."

Other objects of this invention will be apparent to those skilled in the art from the problems which this invention solves.

SUMMARY OF THE INVENTION

This invention comprises a novel apparatus and its use in a process for automatically making stretched plastic material To solve the above-noted problems, plastic is periodically stretched in both its length and width directions. Wrap produced from a machine using this invention will not only exert compression along the length of the material but it will also exert compression along the width of the material. Because the stretching is done substantially prior to being applied to the load, the rupturing problem is reduced.

Further, because the material is not uniformly stretched, it has extra "give" to compensate for protrusions that cause rupturing problems, and attendant delays in wrapping operations. Thus, the load is better secured by the wrap. This invention is particularly useful where the wrap is used to secure a number of objects and where the load can settle.

The invention involves the use of generatrices to stretch plastic material, which is described in U.S. Pat. application Ser. No. 546,034. Unlike Ser. No. 546,034, the invention of this application stretches plastic material in both its length and width directions. This invention contemplates a stretch device comprising a plurality of generatrices in substantially parallel arrangements about a rotational axis; means for moving the generatrices in an eccentric path about a central axis; and means for moving the generatrices in the axial directions and in staggered coordination. The number of generatrices is preferably six to eight, but different arrangements are possible.

In an automated material-stretch apparatus, the device is actuated to impart a biaxial stretch pattern onto the material. An apparatus is comprised of a means for supplying stretchable plastic material; means for automatically stretching the supplied material; and a means for orienting the supplied material at an angle to the stretching means to stretch the material in the length and width directions of the material.

In a preferred embodiment, the material is angled across and partially around a second stretch apparatus oriented to the material at an angle that is substantially equal to the negative of such angle for the first stretch device.

As the material is engaged by the generatrices, the distance between the generatrices and the center axis is increased, the material between the generatrices is stretched. Because the material intersects the device at an angle, the stretch angles across the length and width of the material. The proportion of stretching in each direction depends upon the angle of intersection between the material and device. While the material travels across and partially around the rotating stretching device, the generatrices change their axial location. This compensates for the tendency of the angled material to "walk" or move or change its orientation with respect to the device. After engaging the plastic, the generatrices move from one side of the stretching device to the other. The extent to which the generatrices travel in the axial direction depends on the angle of intersection between the device and material.

The method for practicing the present invention to wrap a load with stretchable plastic material comprises the steps of locating an object on a support; providing stretchable plastic material; angling the material across a stretching means; activating the stretching means to stretch the material in the length and width directions of the material; and to form a wrap.

Due to the friction at the intersection of the plastic material and the generatrices, the tendency of the plastic material to neck down during stretching is opposed. Between the areas of intersection, however, the material can neck-down. This produces an article with a pattern of stretching which corresponds to these areas of intersection. The product of the present invention comprises: biaxially stretched plastic material and a stretch pattern comprising a series of periodic and incremental regions of varying neck-down. The pattern can be described as comprising an alternating series of regions in which the neck-down has been substantially impeded and regions in which neck-down has been substantially unimpeded.

Stretching in the width direction can be increased by using two stretch devices, which also superimposes the pattern of the second stretch device upon that of the first device. Feeding the material across the second stretch device at an angle approximately equal to the negative of the angle of the second stretch device, produces a stretch pattern in a counterveiling direction. This tends to maximize the stretch along the axes of the material. Of course, the amount angle can be manipulated to correspond to the demands of a particular application.

BRIEF DESCRIPTION OF THE DRAWINGS

FIG. 5 is a perspective view of two stretch devices incorporated into a rotary application;

DETAILED DESCRIPTION OF THE DRAWINGS

Figure 1:
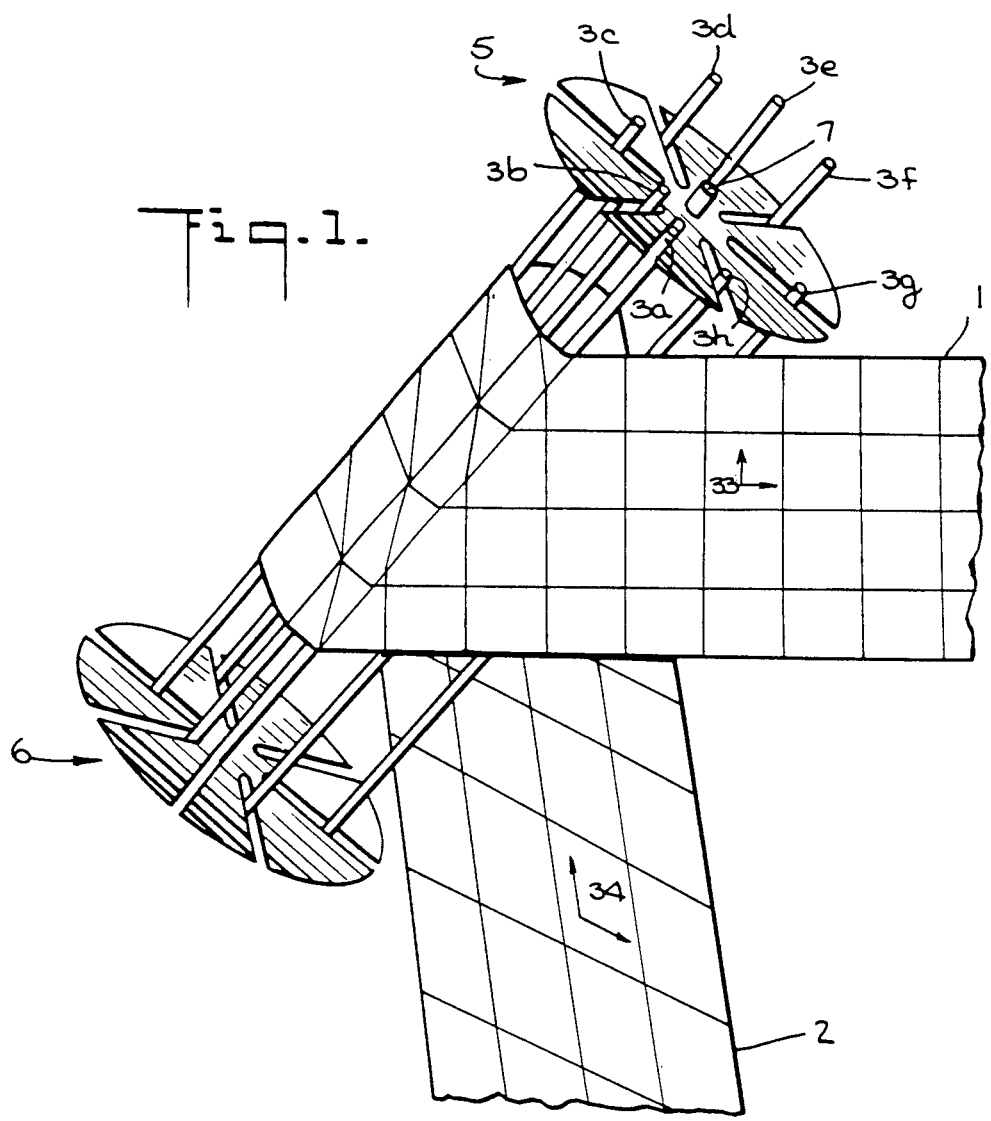
FIG. 1 is a perspective view of the stretching device with the material angling around it.

Referring to the drawings, particularly FIG. 1, v there is illustrated a stretching device wherein stretchable plastic material 1 is stretched to form stretched plastic material 2. The material 1 is angled across one of several generatrices 3, aligned in a substantially parallel configuration and positioned in radial slots 4. These slots are provided in opposing discs, 5 and 6. The slots permit the generatrices to travel in a path perpendicular to the axis of rotation, and thus vary the distance between the generatrices while maintaining substantially parallel alignment. The discs are rotated on rotor 7, which defines the axis of rotation, so as to engage the plastic material or advance the material about the configuration of generatrices.

The first generatrix 3a is located close to the rotor 7 at the time the plastic first contacts and angles across the generatrix. As discs 5 and 6 rotate, the material 1 is carried to the second generatrix 3b, then to 3c and so on. Simultaneously, the generatrices 3 are moved along the radial path defined by slots 4, causing the distance between adjacent generatrices to increase.

The first generatrix 3a is moved simultaneously in an axial direction, i.e. parallel to rotor 7, so as to compensate for the tendency of the angled plastic to "walk" or move along the rotating stretch device. Each generatrix moves in a staggered coordination with the proceeding generatrix. The staggered coordination of the generatrices 3 is illustrated by the positions which they occupy during the cycle of one revolution of the stretch device. After about half of a revolution, the generatrix reaches its most distant point from rotor 7 and the axial movement in one axial direction is at its maximum. As the rotation continues, the contact between the generatrices and the plastic ceases and the generatrices are returned to positions proximate to the rotor 7 and to the opposite axial direction, to begin another cycle.

Figure 2:
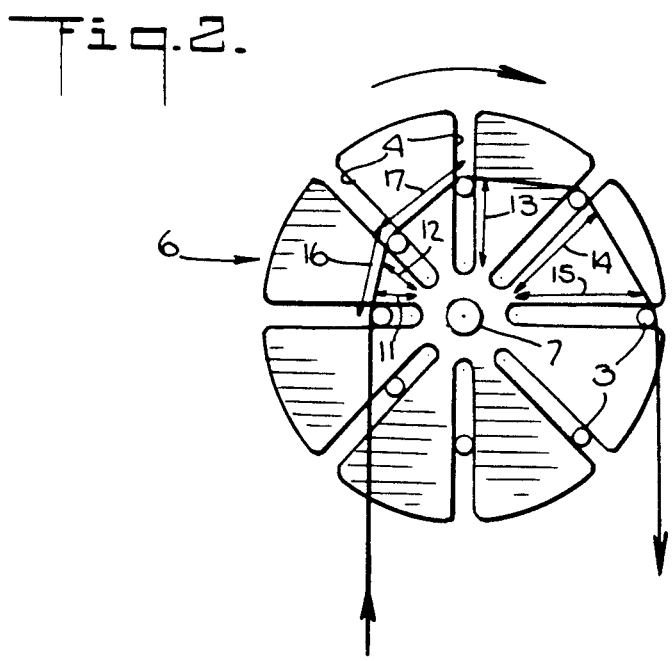
FIG. 2 is a side view of the stretched device with the plastic material angling around it.

FIG. 2 illustrates the manner by which the rotation of generatrices about an axial path produces stretch in the plastic. As disc 6 is rotated about rotor 7, generatrices 3 are moved along the radial path defined by slots 4, varying the distances between the adjacent generatrices. Thus, as the plastic material initially contacts the generatrices, distance 11 is less than or equal to distance 12. Similarly, distance 13 is greater than distance 12, and less than distance 14. After the generatrices become extended, distance 11 is increased to distance 15, and distance 16 is increased to distance 18. Rotating the alignment of generatrices so as to cause them to travel an eccentric path thereby causes stretchable plastic material 1 to become distorted and stretched.

Figure 3:
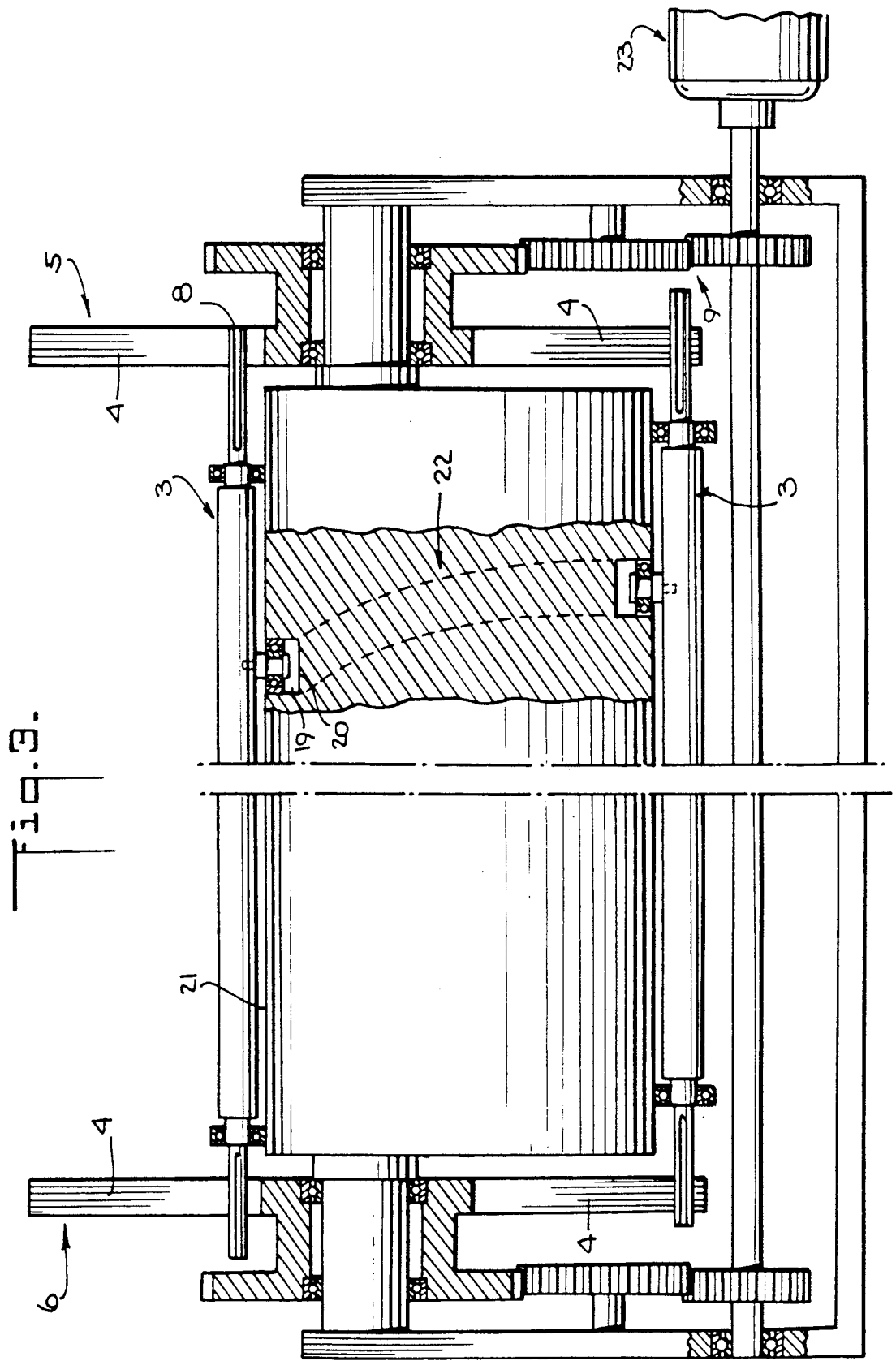
FIG. 3 is a side view, with an internal illustration of a cam.

FIG. 3 is a cutaway view of the stretch device. Generatrices 3 are situated so as to pierce discs 5 and 6 through slots 4. The generatrices are located adjacent to the surface of cam 21. Insert 19 rides in channel 20 so as to secure the generatrix to the cam. Rotation of the generatrices about the cam produces the eccentric path of the generatrices. This motion is induced by motor 23 which rotates discs 5 and 6 about the cam. Additionally, slot 22 forms an elipse around the ca thereby inducing the generatrices to travel from position 8 to position 9 and then back again. So as to reduce the shear forces on the plastic material, the generatrices are allowed to rotate in a ball bearing collar.

Figure 4:
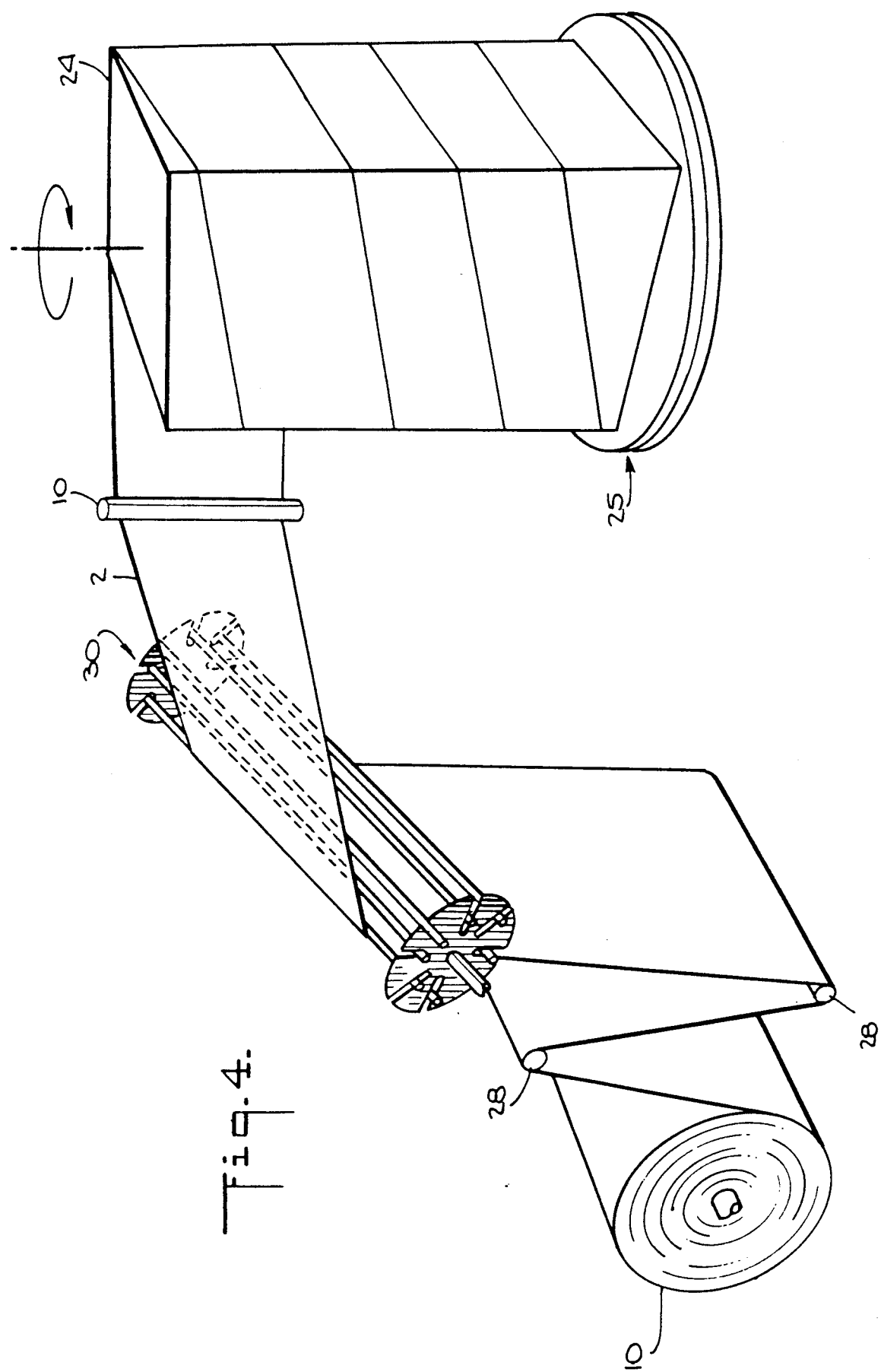
FIG. 4 is a perspective view of one plastic stretching device incorporated into a rotary application.

FIG. 4 is a perspective view of a stretch device incorporated into a rotary wrapping machine. The stretch device may alternatively be incorporated into pass through applications. A roll of stretchable plastic material 10 is unrapped under the tension of rotational friction. The material is fed through a configuration of rollers 28 which ensure the proper tension and alignment of the material. The material is angled across a stretch device 30 so as to cause the material to be biaxially stretched.

The stretched material is maintained under tension and positioned around a load 24 to form a wrap.

FIG. 5 is a perspective view of two stretch devices incorporated into a rotary application. Again, a pass through application is alternately feasible. The tensioned material is angled across stretch devices 30 and 31 which are oriented such that angle beta is substantially equal to the negative of angle alpha. After the stretching by the devices has been completed, the material is passed across a roller 10 which aligns it for use in forming a spiral wrap. Load 24 rotates on a turntable 25 causing the plastic to wind around the load under tension, thereby to forming a spiral wrap.

FIG. 1 also illustrates the stretch imparted onto a net of plastic which, in its unstretched condition, has a rectilinear pattern 33. As the material angles across stretch device 30, it is engaged by the generatrices 3. Because the material intersects the stretch device at an angle, the stretch between the generatrices also angles across the material. With stretching force components in both the length and width directions, this biaxial stretching distorts the web into a parallelogram configuration 34. Due to the stretching of the web, the base and width of the parallogram 34 are increased. Particularly in regions of the plastic that were in contact with the generatrices of stretch device 30 there is a decreased neck-down over other areas of the stretched plastic. This is due to the friction between the generatrix and net which opposes neck-down forces.

While the preferred embodiment of this invention has been disclosed, it is understood that the invention is not limited to such an embodiment because it may be otherwise embodied in the scope of the appended claims, including incorporating this invention in pass through or rotary applications.

I claim:

1. A method of wrapping a load with stretchable plastic material, comprising the steps of:
   (a) locating an object on a support;
   (b) providing stretchable plastic material;
   (c) activating a stretch device comprising a plurality of generatrices having a substantially parallel arrangement, a means for moving the generatrices in an eccentric path about a central axis, and a means for moving the generatrices in the axial directions and in staggered coordination;
   (d) supplying the material across the stretch device at an angel between 0° and 90° to biaxially stretch the material; and
   (e) transporting the stretched material around a load to form a wrap.

2. A method of wrapping a load with stretchable plastic material, comprising the steps of:
   (a) locating an object on a support;
   (b) providing stretchable plastic material;
   (c) activating a first stretch device comprising a plurality of generatrices having a substantially parallel arrangement, a means for moving the generatrices in an eccentric path about a central axis, and a means for moving the generatrices in the axial directions and in staggered coordination;
   (d) supplying the material across the first stretch device at an angel between 0° and 90° to biaxially stretch the material;
   (e) activating a second stretch device comprising a plurality of generatrices having a substantially parallel arrangement, a means for moving the generatrices in an eccentric path about a central axis, and a means for moving the generatrices in the axial directions and in staggered coordination;
   (f) angling the material from the first stretch device across the second stretch device at an angle substantially equal to the negative of the angle at which the material is angled across the firs stretch device, to produce biaxially stretched material; and
   (g) transporting the stretched material around a load to form a wrap.

* * * * *